(12) United States Patent
Yamada et al.

(10) Patent No.: US 10,960,908 B2
(45) Date of Patent: Mar. 30, 2021

(54) TRAIN EQUIPMENT MANAGEMENT SYSTEM, TRAIN EQUIPMENT MANAGEMENT METHOD AND COMPUTER READABLE MEDIUM

(71) Applicant: MITSUBISHI ELECTRIC CORPORATION, Tokyo (JP)

(72) Inventors: Masafumi Yamada, Tokyo (JP); Takeshi Takeuchi, Tokyo (JP); Norimitsu Nagashima, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 111 days.

(21) Appl. No.: 16/311,423

(22) PCT Filed: Aug. 10, 2016

(86) PCT No.: PCT/JP2016/073540
§ 371 (c)(1),
(2) Date: Dec. 19, 2018

(87) PCT Pub. No.: WO2018/029799
PCT Pub. Date: Feb. 15, 2018

(65) Prior Publication Data
US 2019/0232987 A1    Aug. 1, 2019

(51) Int. Cl.
*B61L 15/00* (2006.01)
*G06Q 10/06* (2012.01)
(Continued)

(52) U.S. Cl.
CPC ....... *B61L 15/0072* (2013.01); *B61L 15/0081* (2013.01); *G06Q 10/00* (2013.01);
(Continued)

(58) Field of Classification Search
CPC . B61L 15/0072; B61L 15/0081; G06Q 10/06; G06Q 50/30; G06Q 10/00; G06Q 10/20
(Continued)

(56) References Cited

U.S. PATENT DOCUMENTS

| | | | | |
|---|---|---|---|---|
| 4,041,470 A | * | 8/1977 | Slane | B60L 3/12 |
| | | | | 701/29.1 |
| 8,781,671 B2 | * | 7/2014 | Beck | B60W 10/20 |
| | | | | 701/29.1 |
| 8,922,385 B2 | * | 12/2014 | Brown | B61L 15/0081 |
| | | | | 340/686.1 |

FOREIGN PATENT DOCUMENTS

| | | |
|---|---|---|
| JP | 2005-73448 A | 3/2005 |
| JP | 3645181 B2 | 5/2005 |

(Continued)

OTHER PUBLICATIONS

Extended European Search Report dated Mar. 25, 2019 received in corresponding European Application No. 16912680.2.
(Continued)

*Primary Examiner* — Marthe Y Marc-Coleman
(74) *Attorney, Agent, or Firm* — Birch, Stewart, Kolasch & Birch, LLP

(57) ABSTRACT

An extraction unit (121) determines, by using a fixed composition file, a fixed composition including a car having a specified equipment installed thereon as a fixed specified composition. The extraction unit determines, by using an operation composition file, an operation composition including the fixed specified composition as an operation specified composition. The extraction unit extracts, from an environment file, environment information corresponding to a set of a specified time and the operation specified composition. A conversion unit (122) converts, by using the environment information, state information indicating the state of the specified equipment at the specified time to comparative
(Continued)

information indicating the state of the specified equipment in a reference environment. An evaluation unit (123) compares the comparative information with reference information. Then, the evaluation unit evaluates the state of the specified equipment at the specified time based on the comparison result.

13 Claims, 15 Drawing Sheets

(51) Int. Cl.
    *G06Q 50/30*     (2012.01)
    *G06Q 10/00*     (2012.01)

(52) U.S. Cl.
    CPC ............. *G06Q 10/06* (2013.01); *G06Q 10/20* (2013.01); *G06Q 50/30* (2013.01)

(58) Field of Classification Search
    USPC .......................................................... 701/19
    See application file for complete search history.

(56) References Cited

FOREIGN PATENT DOCUMENTS

| | | |
|---|---|---|
| JP | 2007-137118 A | 6/2007 |
| JP | 2009-18770 A | 1/2009 |
| JP | 4881363 B2 | 2/2012 |
| JP | 2014-88084 A | 5/2014 |
| JP | 5611150 B2 | 10/2014 |
| JP | 2015-193359 A | 11/2015 |
| WO | WO 00/35732 A1 | 6/2000 |

OTHER PUBLICATIONS

International Search Report, issued in PCT/JP2016/073540, PCT/ISA/210, dated Oct. 25, 2016.
European Summons to Attend Oral Proceedings Pursuant to Rule 115(1) EPC for European Application No. 16912680.2, dated Apr. 8, 2020.
European Communication pursuant to Article 94(3) EPC for European Application No. 16912680.2, dated Oct. 30, 2019.
Decision to refuse a European Patent Application dated Dec. 11, 2020 in corresponding European Application No. 16 912 680.2.

* cited by examiner

Fig. 4

210: ENVIRONMENT FILE

| TIME | CAR NUMBER | ENVIRONMENT INFORMATION | MAIN COMPOSITION ID |
|---|---|---|---|
| TIME (1) | NO. 1 | ENVIRONMENT INFORMATION (1) | MAIN COMPOSITION (1) |
| TIME (1) | NO. 2 | ENVIRONMENT INFORMATION (2) | MAIN COMPOSITION (1) |
| : | : | : | : |

220: STATE FILE

| TIME | EQUIPMENT ID | STATE INFORMATION |
|---|---|---|
| TIME (1) | EQUIPMENT (1) | STATE INFORMATION (1) |
| TIME (1) | EQUIPMENT (2) | STATE INFORMATION (2) |
| : | : | : |

230: FIXED COMPOSITION FILE

| FIXED COMPOSITION ID | CAR NUMBER | EQUIPMENT INFORMATION | START TIME | END TIME | |
|---|---|---|---|---|---|
| COMPOSITION (1) | NO. 1 | EQUIPMENT (1) | TIME (1) | — | ← 231 |
| COMPOSITION (1) | NO. 2 | EQUIPMENT (2) | TIME (2) | — | |
| ⋮ | ⋮ | ⋮ | ⋮ | ⋮ | |

Fig. 7

240: OPERATION COMPOSITION FILE

| MAIN COMPOSITION ID | SUB-COMPOSITION INFORMATION | START TIME | END TIME | LINE INFORMATION | |
|---|---|---|---|---|---|
| COMPOSITION (1) | COMPOSITION (2) | TIME (1) | — | LINE (1) | ← 241 |
| ⋮ | ⋮ | ⋮ | ⋮ | ⋮ | |

Fig. 10

250:REFERENCE FILE

| MODEL ID | ENVIRONMENT REFERENCE INFORMATION | STATE REFERENCE INFORMATION | |
|---|---|---|---|
| MODEL (1) | REFERENCE ENVIRONMENT (1) | REFERENCE STATE (1) | ← 251 |
| : | : | : | |

Fig.16

260:COMPARATIVE INFORMATION FILE

| TIME | EQUIPMENT ID | COMPARATIVE INFORMATION | |
|---|---|---|---|
| TIME (1) | EQUIPMENT (1) | COMPARATIVE INFORMATION (1) | ← 261 |
| TIME (1) | EQUIPMENT (2) | COMPARATIVE INFORMATION (2) | |
| ⋮ | ⋮ | ⋮ | |

TRAIN EQUIPMENT MANAGEMENT SYSTEM, TRAIN EQUIPMENT MANAGEMENT METHOD AND COMPUTER READABLE MEDIUM

TECHNICAL FIELD

The present invention relates to a technique for managing an equipment installed on a train.

BACKGROUND ART

With penetration of ICT (Information and Communication Technology) in railroad systems, accumulation of equipment operation data and environment data from operating cars is becoming possible.

Also, in the railroad industry, for the purpose of preventing an equipment failure and reducing a life cycle cost, moves for CBM (Condition Based Maintenance) of equipments are being accelerated.

Patent Literature 1 discloses a car maintenance system.

In this car maintenance system, monitor data collected by a monitoring device installed on a car is compared with information required for failure diagnosis and information regarding determination criteria for inspection and repair.

CITATION LIST

Patent Literature

Patent Literature 1: JP No. 4881363

SUMMARY OF INVENTION

Technical Problem

An object of the present invention is to allow evaluation of the state of a specified equipment at a specified time.

Solution to Problem

A train equipment management apparatus according to the present invention includes:
  a conversion unit to convert, by using environment information indicating an environment of a car having a specified equipment installed thereon at a specified time, state information indicating a state of the specified equipment at the specified time to comparative information indicating a state of the specified equipment in a reference environment; and
  an evaluation unit to evaluate the state of the specified equipment at the specified time by using the comparative information and reference information indicating a state serving as a reference.

Advantageous Effects of Invention

According to the present invention, the state of a specified equipment at a specified time can be evaluated.

BRIEF DESCRIPTION OF DRAWINGS

FIG. 4 illustrates an environment file 210 in Embodiment 1.

FIG. 5 illustrates a state file 220 in Embodiment 1.

FIG. 6 illustrates a fixed composition file 230 in Embodiment 1.

FIG. 7 illustrates an operation composition file 240 in Embodiment 1.

FIG. 10 illustrates a reference file 250 in Embodiment 1.

FIG. 16 illustrates a comparative information file 260 in Embodiment 3.

DESCRIPTION OF EMBODIMENTS

Figure 1:
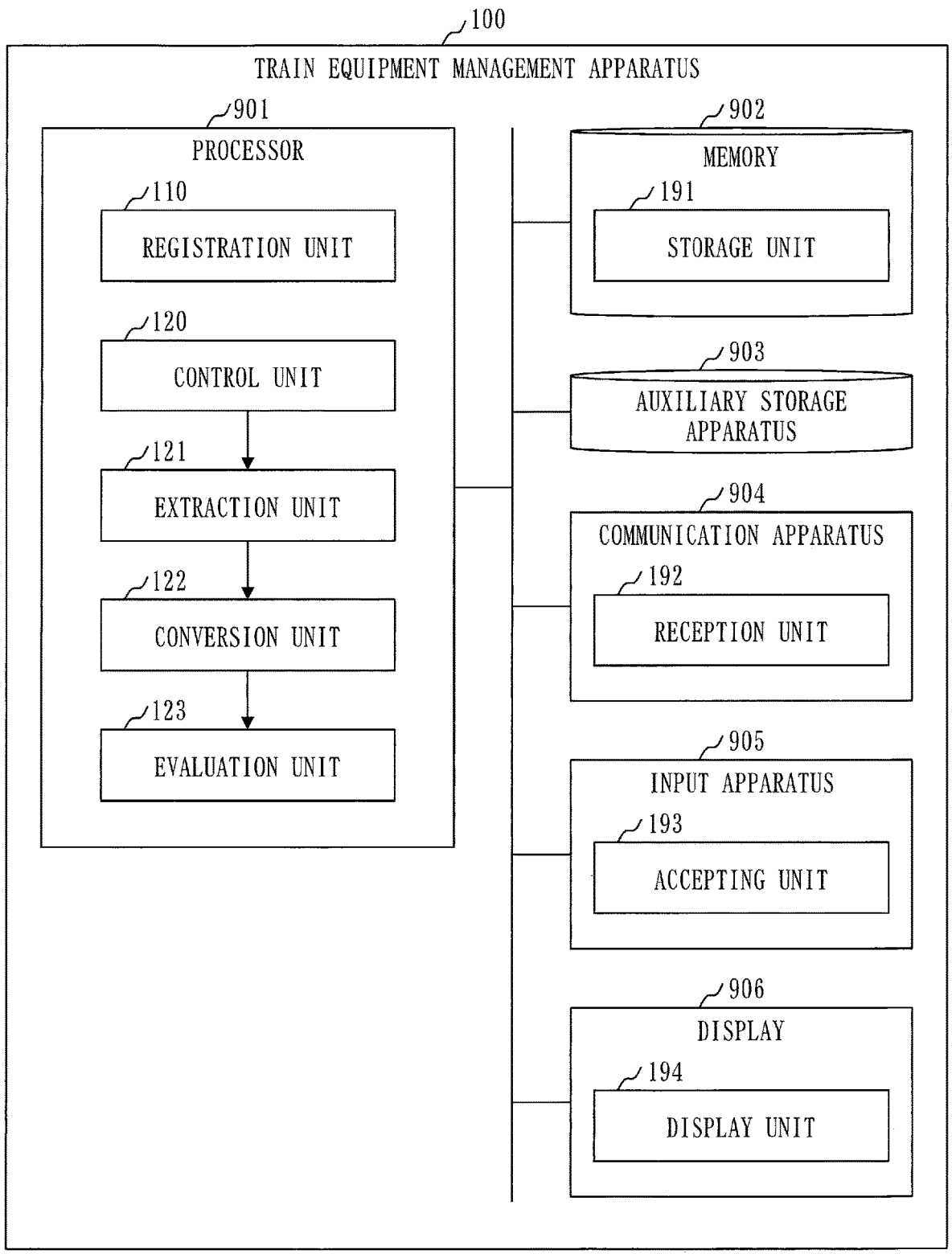
FIG. 1 illustrates a structure of a train equipment management apparatus 100 in Embodiment 1.

In the embodiments and the drawings, components identical or equivalent to each other are provided with the same reference characters. Description of the components with the same reference characters are omitted or simplified as appropriate.

Embodiment 1

A mode of managing an equipment installed on a train is described based on FIG. 1 to FIG. 13.

Description of Structure

Based on FIG. 1, the structure of a train equipment management apparatus 100 is described.

The train equipment management apparatus 100 is a computer including hardware such as a processor 901, a memory 902, an auxiliary storage apparatus 903, a communication apparatus 904, an input apparatus 905, and a display 906. These pieces of hardware are mutually connected via signal lines.

The processor 901 is an IC (Integrated Circuit) for performing processing, and controls other hardware. Specifically, the processor 901 is a CPU, DSP, or GPU. CPU is an abbreviation for Central Processing Unit, DSP is an abbreviation for Digital Signal Processor, and GPU is an abbreviation for Graphics Processing Unit.

The memory 902 is a volatile storage apparatus. The memory 902 is also referred to as a main storage apparatus or main memory. Specifically, the memory 902 is a RAM (Random Access Memory).

The auxiliary storage apparatus 903 is a non-volatile storage apparatus. Specifically, the auxiliary storage apparatus 903 is a ROM, HDD, or flash memory. ROM is an abbreviation for Read Only Memory, and HDD is an abbreviation for Hard Disk Drive.

Hardware with the processor 901, the memory 902, and the auxiliary storage apparatus 903 brought together is referred to as "processing circuitry".

The communication apparatus 904 is an apparatus for performing communication, and includes a receiver and a transmitter. Specifically, the communication apparatus 904 is a communication chip or NIC (Network Interface Card).

The input apparatus 905 is an apparatus which accepts inputs. Specifically, the input apparatus 905 is a keyboard, mouse, ten-key pad, or touch panel.

The display 906 is a display apparatus which displays images and so forth. Specifically, the display 906 is a liquid-crystal display. The display 906 is also referred to as a monitor.

The train equipment management apparatus 100 includes "units" such as a registration unit 110, a control unit 120, an extraction unit 121, a conversion unit 122, and an evaluation unit 123 as functional components. The functions of the "units" are implemented by software. The functions of the "units" will be described further below.

In the auxiliary storage apparatus 903, programs for implementing the functions of the "units" are stored. The programs for implementing the functions of the "units" are loaded to the memory 902 and executed by the processor 901.

Furthermore, in the auxiliary storage apparatus 903, an OS (Operating System) is stored. At least part of the OS is loaded to the memory 902 and executed by the processor 901.

That is, the processor 901 executes the programs for implementing the functions of the "units" while executing the OS.

Data acquired by executing the programs for implementing the functions of the "units" is stored in a storage apparatus such as the memory 902, the auxiliary storage apparatus 903, a register in the processor 901, or a cache memory in the processor 901.

The memory 902 functions as a storage unit 191 where data to be used, generated, inputted or outputted, or transmitted or received in the train equipment management apparatus 100 is stored. However, another storage apparatus may function as the storage unit 191.

The communication apparatus 904 functions as a communication unit which communicates data. In the communication apparatus 904, the receiver functions as a reception unit 192 which receives data, and the transmitter functions as a transmission unit which transmits data.

The input apparatus 905 functions as an accepting unit 193 which accepts inputs.

The display 906 functions as a display unit 194 which displays images and so forth.

The train equipment management apparatus 100 may include a plurality of processors which replace the processor 901. The plurality of processors share execution of the programs implementing the functions of the "units".

The programs implementing the functions of the "units" can be stored in a non-volatile storage medium such as a magnetic disk, optical disk, or flash memory so as to be computer-readable. The non-volatile storage medium is a non-transitory tangible medium.

The "units" may be replaced by "processes" or "steps". The functions of the "units" may be implemented by firmware.

Description of Operation

The operation of the train equipment management apparatus 100 corresponds to a train equipment management method. Also, the procedure of the train equipment management method corresponds to the procedure of a train equipment management program.

First, terms are described.

A car refers to a car for use in a train, that is, a car travelling on a rail.

A composition is constituted of one or more cars, and is also referred to as a train composition.

A fixed composition is a composition constituted in advance.

An operation composition is a composition to be operated in railroad, and is constituted by coupling one or more fixed compositions.

A main composition is one fixed composition of fixed compositions included in the operation composition.

A sub-composition is a fixed composition other than the main composition among the fixed compositions included in the operation composition.

A time refers to a point in time. Specifically, the time is represented by a set of year, month, and day and hour, minute, and second.

Figure 2:
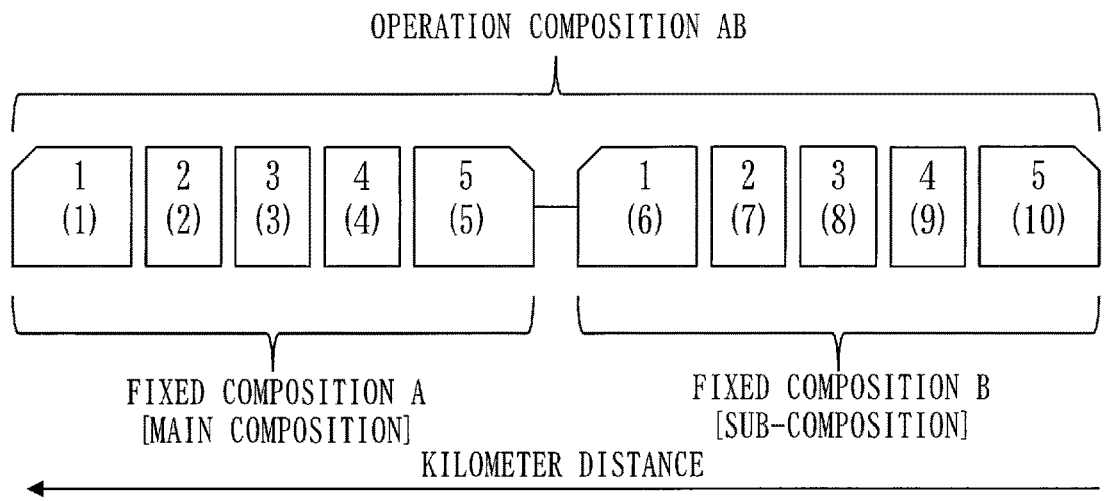
FIG. 2 illustrates an operation composition AB in Embodiment 1.

Based on FIG. 2, the main composition and the sub-composition are described.

An operation composition AB is an operation composition with a fixed composition A and a fixed composition B coupled together.

The fixed composition A and the fixed composition B are each constituted of five cars from a first car to a fifth car. The operation composition AB is constituted of ten cars from a first car to a tenth car.

The order of the car numbers correspond to the descending order in kilometer distance. That is, the car number of a car positioned at a larger kilometer distance is smaller than the car number of a car positioned at a smaller distance. The kilometer distance is a distance from a starting point.

In the operation composition AB, the fixed composition A positioned at a larger kilometer distance is the main composition, and the fixed composition B, which is not the main composition, is the sub-composition.

The descending order in kilometer distance is not changed between the case in which the operation composition AB proceeds to a forward direction and the case in which the operation composition AB proceeds to a backward direction. Therefore, even if the operation composition AB operates reversely, the main composition is not changed from the fixed composition A.

Figure 3:
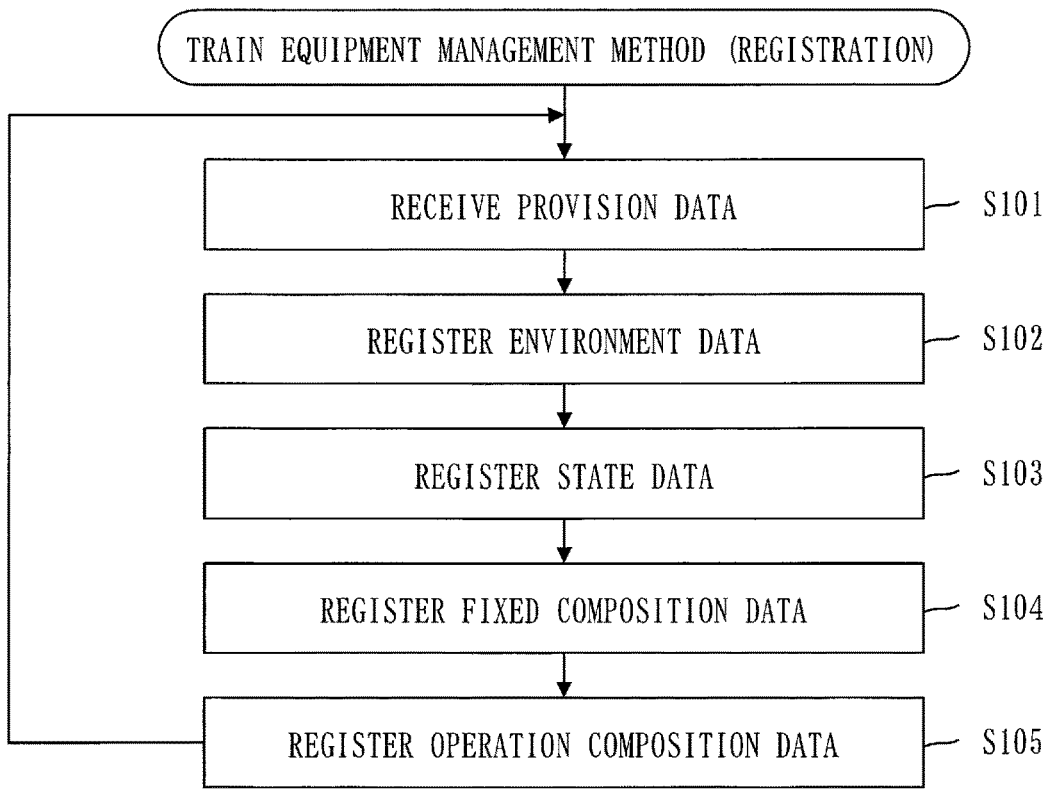
FIG. 3 is a flowchart of a train equipment management method (registration) in Embodiment 1.

Based on FIG. 3, a train equipment management method (registration) is described.

The train equipment management method (registration) is a method of registering provision data provided from the operation composition. The operation composition regularly transmits provision data. The provision data will be described further below.

Step S101 is a reception process.

At step S101, the reception unit 192 receives provision data transmitted from the operation composition.

The provision data includes environment data for each car included in the operation composition, state data for each equipment included in the operation composition, fixed composition data for each fixed composition included in the operation composition, and operation composition data of the operation composition.

The environment data is data indicating an environment of a car, and includes a time, a car number, environment information, and a main composition ID.

The time included in the environment data is a time when the environment data is collected.

The car number is an identifier for identifying a car. The car is identified by a set of the main composition ID and the car number.

The environment information is information indicating an environment where the car is operated. Specifically, the environment information includes a car occupancy rate, temperature, position, speed, instruction value, and so forth. The instruction value is a value indicating an instruction for an equipment.

The main composition ID is an identifier for identifying the main composition. The ID is an identifier.

The state data is data indicating the state of the equipment, and includes a time, an equipment ID, and state information.

The time included in the state data is a time when the state information is collected.

The equipment ID is an identifier for identifying the equipment.

The state information is information indicating the state of the equipment. Specifically, the state information includes the number of times of opening/closing of a contact, a current value, temperature, pressure value, and so forth. The number of times of opening/closing of a contact is the number of times of opening/closing a contact included in the equipment. The current value is a value indicating a current flowing through the equipment. The pressure value is a value indicating a pressure applied to the equipment.

The fixed composition data is data indicating an equipment installed on the car included in the fixed composition, and includes a time, a fixed composition ID, a car number, and equipment information.

The time included in the fixed composition data is a time when the fixed composition data is generated.

The fixed composition ID is an identifier for identifying the fixed composition.

The car number is an identifier for identifying the car. The car is identified by a set of the fixed composition ID and the car number.

The equipment information includes an equipment ID for each equipment installed on the car.

The operation composition data is data indicating fixed compositions included in the operation composition, and includes a time, a main composition ID, sub-composition information, and a line information.

The time included in the operation composition data is a time when the operation composition data is generated.

The main composition ID is an identifier for identifying the main composition.

The sub-composition information includes a sub-composition ID for each sub-composition. Specifically, the sub-composition information includes sub-composition IDs in the order in which the sub-compositions are arranged.

The sub-composition ID is an identifier for identifying a sub-composition.

The line information includes a line ID for each line where the operation composition is operated.

The line ID is an identifier for identifying a line.

Step S102 to step S105 are a registration process.

At step S102, the registration unit 110 extracts environment data from the received provision data, and registers the extracted environment data on an environment file 210.

Based on FIG. 4, the environment file 210 is described. The environment file 210 is stored in the storage unit 191.

The environment file 210 is a table including an environment record 211 for each set of a time and a car. One row in the environment file 210 corresponds to one environment record 211.

The environment record 211 includes a time, a car number, environment information, and a main composition ID.

By referring back to FIG. 3, the description of step S102 continues.

Specifically, the registration unit 110 registers the environment data on the environment file 210 in a manner as follows.

The registration unit 110 generates an environment record 211 by using the time, the car number, the environment information, and the main composition ID included in the environment data. Then, the registration unit 110 adds the generated environment record 211 to the environment file 210.

Next, step S103 is described.

At step S103, the registration unit 110 extracts state data from the received provision data, and registers the extracted state data on the state file 220.

Based on FIG. 5, the state file 220 is described. The state file 220 is stored in the storage unit 191.

The state file 220 is a table including a state record 221 for each set of a time and an equipment. One row in the state file 220 corresponds to one state record 221.

The state record 221 includes a time, an equipment ID, and state information.

By referring back to FIG. 3, the description of step S103 continues.

Specifically, the registration unit 110 registers the state data on the state file 220 in a manner as follows.

The registration unit 110 generates a state record 221 by using the time, the equipment ID, and the state information included in the state data. Then, the registration unit 110 adds the generated state record 221 to the state file 220.

Next, step S104 is described.

At step S104, the registration unit 110 extracts fixed composition data from the received provision data, and registers the extracted fixed composition data on the fixed composition file 230 as required. Specifically, the registration unit 110 registers the fixed composition data on the fixed composition file 230 when a change occurs in the equipment information.

Based on FIG. 6, the fixed composition file 230 is described. The fixed composition file 230 is stored in the storage unit 191.

The fixed composition file 230 is a table including the fixed composition record 231 for each car. One row in the fixed composition file 230 corresponds to one fixed composition record 231.

The fixed composition record 231 includes a fixed composition ID, a car number, equipment information, a start time, and an end time.

The start time is a time at the start of an installation period. The installation period is a period in which the equipment is installed on the car.

The end time is a time at the end of the installation period. A hyphen refers to non-end.

By referring back to FIG. 3, the description of step S104 continues.

Specifically, the registration unit 110 registers the fixed composition data on the fixed composition file 230 in a manner as follows.

First, the registration unit 110 selects, from the fixed composition file 230, a fixed composition record 231 corresponding to the fixed composition ID and the car number included in the fixed composition data. The selected fixed composition record 231 is a fixed composition record 231 in which no end time is set.

Next, the registration unit 110 compares the equipment information included in the fixed composition data with the equipment information included in the selected fixed composition record 231.

When both pieces of equipment information do not match, the registration unit 110 sets the time included in the fixed composition data in an end time field of the selected fixed composition record 231. Furthermore, the registration unit 110 generates a fixed composition record 231 by using the fixed composition ID, the car number, the equipment information, and the time included in the fixed composition data, and adds the generated fixed composition record 231 to the fixed composition file 230. In the generated fixed composition record 231, the time included in the fixed composition data is set in a start time field, and a hyphen is set in an end time field.

Next, step S105 is described.

At step S105, the registration unit 110 extracts operation composition data from the received provision data, and registers the extracted operation composition data on an operation composition file 240 as required. Specifically, the registration unit 110 registers the operation composition data on the operation composition file 240 when a change occurs in the sub-composition information.

Based on FIG. 7, the operation composition file 240 is described. The operation composition file 240 is stored in the storage unit 191.

The operation composition file 240 is a table including an operation composition record 241 for each operation composition. In detail, the operation composition file 240 includes an operation composition record 241 for each set of an operation composition and an operation period. The operation period is a period in which the operation composition is operated. The period is a set of times.

One row in the operation composition file 240 corresponds to one operation composition record 241.

The operation composition record 241 includes a main composition ID, sub-composition information, a start time, an end time, and line information.

The main composition ID is an identifier for identifying the main composition.

The sub-composition information includes a sub-composition ID for each sub-composition. Specifically, the sub-composition information includes sub-composition IDs in the order in which the sub-compositions are arranged.

The start time is a time at the start of the operation period.

The end time is a time at the end of the operation period. A hyphen refers to non-end.

The line information includes a line ID for each line where the operation composition is operated.

By referring back to FIG. 3, the description of step S105 continues.

Specifically, the registration unit 110 registers the operation composition data on the operation composition file 240 in a manner as follows.

First, the registration unit 110 selects, from the operation composition file 240, an operation composition record 241 corresponding to the main composition ID included in the operation composition data. The selected operation composition record 241 is an operation composition record 241 in which no end time is set.

Next, the registration unit 110 compares the sub-composition information included in the operation composition data with the sub-composition information included in the selected operation composition record 241.

When both pieces of sub-composition information do not match, the registration unit 110 sets the time included in the operation composition data in an end time field of the selected operation composition record 241. Furthermore, the registration unit 110 generates an operation composition record 241 by using the main composition ID, the sub-composition information, the time, and the line information included in the operation composition data, and adds the generated operation composition record 241 to the operation composition file 240. In the generated operation composition record 241, the time included in the operation composition data is set in a start time field, and a hyphen is set in an end time field.

Figure 8:
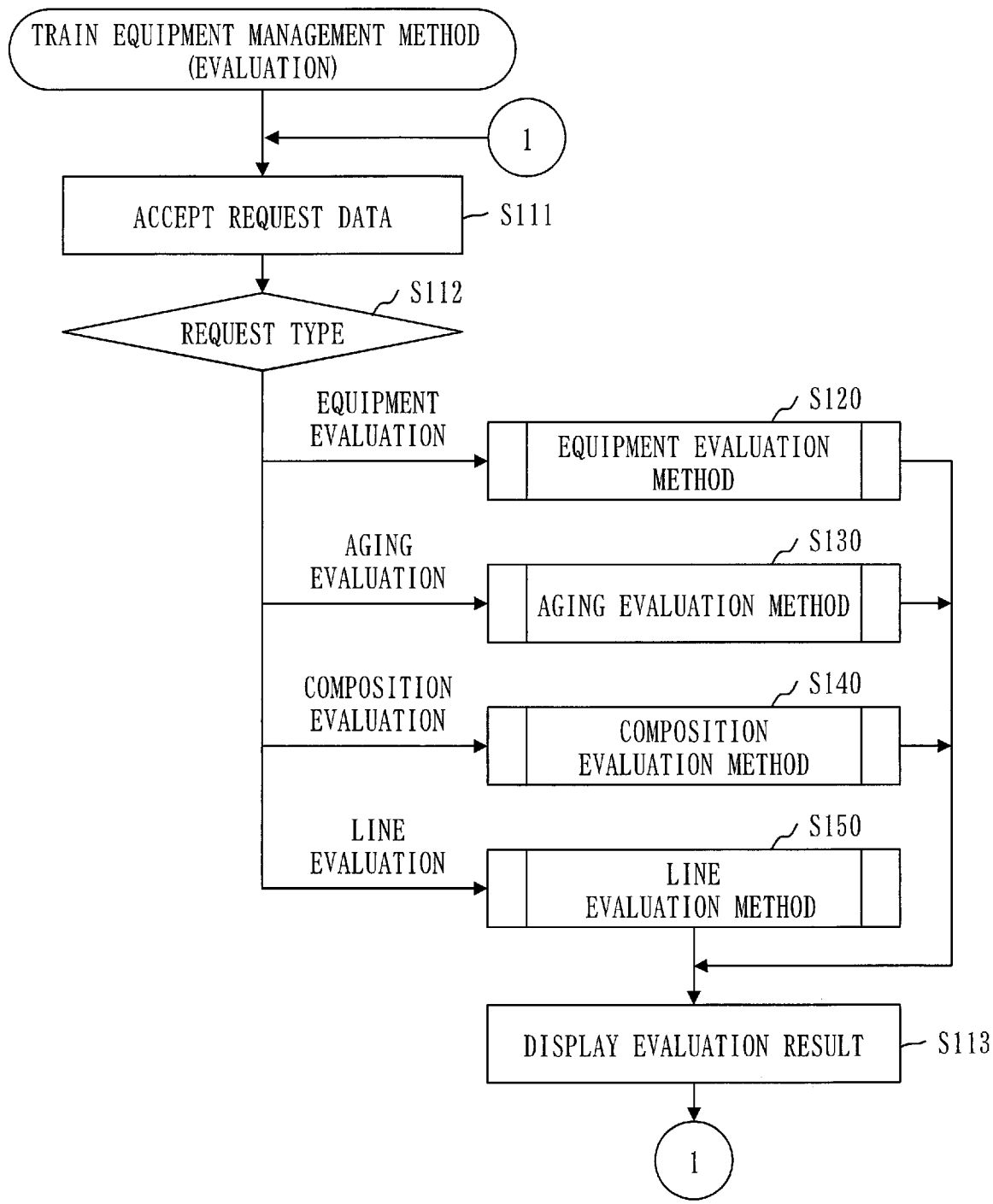
FIG. 8 is a flowchart of a train equipment management method (evaluation) in Embodiment 1.

Based on FIG. 8, a train equipment management method (evaluation) is described.

The train equipment management method (evaluation) is a method of evaluating the state of the equipment.

Step S111 is an accepting process.

At step S111, a user operates the input apparatus 905 to input request data to the train equipment management apparatus 100.

Then, the accepting unit 193 accepts the inputted request data.

Specifically, the control unit 120 instructs the display unit 194 to display a request screen, and the display unit 194 displays the request screen. The request screen is a screen for inputting request data, and includes a graphical user interface for selecting information included in request data. A specific user interface is a context menu, radio button, drop-down list, text box, or the like.

The user inputs request data via the request screen, and the accepting unit 193 accepts the request data via the request screen.

The request data is data for requesting evaluation of the state of the equipment.

The request data includes a request type indicating a type of evaluation.

The request type is any of equipment evaluation, aging evaluation, composition evaluation, and line evaluation.

Equipment evaluation refers to evaluation of the state of a specified equipment at a specified time.

When the request type is equipment evaluation, the request data includes a specified time and a specified equipment ID, in addition to a request type. The specified equipment ID is an equipment ID for identifying a specified equipment.

Aging evaluation refers to evaluation of the state of a specified equipment in a specified period.

When the request type is aging evaluation, the request data includes a specified period and a specified equipment ID, in addition to a request type.

Composition evaluation refers to evaluation of the state of the same model in the operation composition including specified equipments.

When the request type is composition evaluation, the request data includes a specified time and a specified equipment ID, in addition to a request type.

Line evaluation refers to evaluation of the state of the same models in the operation composition operated in the same line.

When the request type is line evaluation, the request data includes a specified time and a specified equipment ID, in addition to a request type.

At step S112, the control unit 120 extracts a request type from the accepted request data, and determines the extracted request type.

When the request type is equipment evaluation, the process proceeds to step S120. Step S120 is an equipment evaluation method. The equipment evaluation method (S120) will be described further below.

When the request type is aging evaluation, the process proceeds to step S130. Step S130 is an aging evaluation method. The aging evaluation method (S130) will be described further below.

When the request type is composition evaluation, the process proceeds to step S140. Step S140 is a composition evaluation method. The composition evaluation method (S140) will be described further below.

When the request type is line evaluation, the process proceeds to step S150. Step S150 is a line evaluation method. The line evaluation method (S150) will be described further below.

After the equipment evaluation method (S120), the aging evaluation method (S130), the composition evaluation method (S140), or the line evaluation method (S150), the process proceeds to step S113.

Step S113 is a display process.

At step S113, the display unit 194 displays the evaluation result acquired in the equipment evaluation method (S120), the aging evaluation method (S130), the composition evaluation method (S140), or the line evaluation method (S150).

Figure 9:
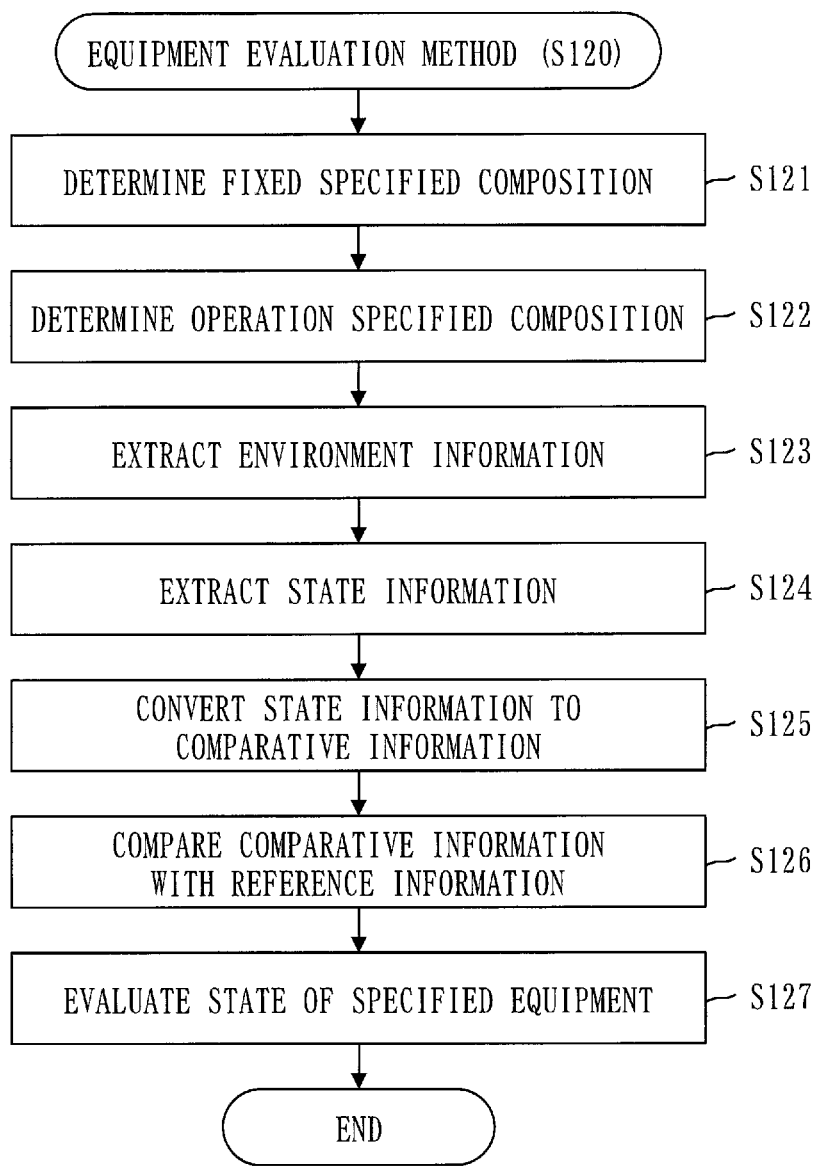
FIG. 9 is a flowchart of an equipment evaluation method (S120) in Embodiment 1.

Based on FIG. 9, the equipment evaluation method (S120) is described.

Step S121 to step S124 are an extraction process.

At step S121, the extraction unit 121 determines a fixed specified composition by using the fixed composition file 230. The fixed specified composition is a fixed composition including a car having a specified equipment installed thereon.

Specifically, the extraction unit 121 determines a fixed specified composition in a manner as follows.

First, the extraction unit 121 extracts a specified equipment ID and a specified time from the request data.

Next, the extraction unit 121 selects, from the fixed composition file 230, a fixed composition record 231 corresponding to the specified equipment ID and the specified time. The fixed composition record 231 corresponding to the specified equipment ID and the specified time is a fixed composition record 231 which includes equipment information including the specified equipment ID, includes a time before the specified time as a start time, and also includes a time after the specified time or non-end as an end time.

Then, the extraction unit 121 extracts a fixed composition ID and a car number from the selected fixed composition record 231.

The fixed composition identified by the extracted fixed composition ID is a fixed specified composition. The fixed composition ID for identifying the fixed specified composition is referred to as a fixed specified composition ID.

The car identified by the extracted fixed composition ID and car number is a specified car. The specified car is a car having the specified equipment installed thereon.

When the specified equipment ID is an equipment (1) and the specified time is a time (1), the extraction unit 121 determines the fixed composition identified by a composition (1) as a fixed specified composition by using the fixed composition file 230 of FIG. 6.

At step S122, the extraction unit 121 determines an operation specified composition by using the operation composition file 240. The operation specified composition is an operation composition including the fixed specified composition.

Specifically, the extraction unit 121 determines an operation specified composition in a manner as follows.

First, the extraction unit 121 extracts a specified time from the request data.

Next, the extraction unit 121 selects, from the operation composition file 240, an operation composition record 241 corresponding to the fixed specified composition and the specified time. The operation composition record 241 corresponding to the fixed specified composition and the specified time is an operation composition record 241 which includes the fixed specified composition ID as a main composition ID or a sub-composition ID, includes a time before the specified time as a start time, and also includes a time after the specified time or non-end as an end time.

Then, the extraction unit 121 extracts the main composition ID and the sub-composition ID from the selected operation composition record 241.

The operation composition which includes a fixed composition identified by the extracted main composition ID as a main composition and includes a fixed composition identified by the extracted sub-composition ID as a sub-composition is an operation specified composition.

When the fixed specified composition is a composition (1) and the specified time is the time (1), the extraction unit 121 determines, as an operation specified composition, an operation composition including the fixed composition identified by the composition (1) as a main composition, by using the operation composition file 240 of FIG. 7.

At step S123, the extraction unit 121 extracts, from the environment file 210, environment information corresponding to a set of the specified time and the operation specified composition.

Specifically, the extraction unit 121 extracts environment information corresponding to a set of the specified time and the operation specified composition in a manner as follows.

First, the extraction unit 121 extracts, from the fixed composition file 230, a maximum car number corresponding to the fixed composition ID identical to the main composition ID extracted at step S122. Also, the extraction unit 121 extracts, from the fixed composition file 230, a maximum car number corresponding to the fixed composition ID identical to the sub-composition ID in the order in which the sub-composition IDs extracted at step S122 are arranged.

Next, the extraction unit 121 computes a car number of a specified car in the operation composition by using the extracted maximum car number and the fixed composition ID of the fixed specified composition extracted at step S121 and the car number of the specified car. In the operation composition having the main composition, the first sub-composition, and the fixed specified composition coupled in this order, when the maximum car number of the main composition is 5, the maximum car number of the first sub-composition is 4, and the car number of the specified car in the fixed composition is 3, the car number of the specified car in the operation composition is 12 (=5+4+3).

Next, the extraction unit 121 selects, from the environment file 210, an environment record 211 including the specified time, the car number of the specified car in the operation composition, and the main composition ID extracted at step S122.

Then, the extraction unit 121 extracts the environment information from the selected environment record 211.

At step S124, the extraction unit 121 extracts, from the state file 220, state information corresponding to a set of the specified time and the specified equipment.

Specifically, the extraction unit 121 selects, from the state file 220, a state record 221 including the specified time and the specified equipment ID. Then, the extraction unit 121 extracts the state information from the selected state record 221.

Step S125 is a conversion process.

At step S125, the conversion unit 122 converts the state information extracted at step S124 to comparative information by using the environment information extracted at step S123. The comparative information is information indicating the state of the specified equipment in a reference environment. The reference environment is an environment serving as a reference.

Specifically, the conversion unit 122 converts the state information to comparative information in a manner as follows.

First, the conversion unit 122 determines a model of the specified equipment by using the specified equipment ID. Specifically, the conversion unit 122 extracts an N-th character from the head of the specified equipment ID as a model ID of the specified equipment. The model ID is an identifier for identifying a model. N is the number of characters defined in advance.

Next, the conversion unit 122 selects, from a reference file 250, a reference record 251 including the model ID of the specified equipment and extracts environment reference information from the selected reference record 251. The reference file 250, the reference record 251, and the environment reference information will be described further below.

Next, the conversion unit 122 selects a conversion equation corresponding to the model of the specified equipment. The conversion equation is an equation for converting state information to comparative information, and is defined in advance for each model. The conversion equation includes a variable corresponding to environment reference information and a variable corresponding to environment information.

Next, the conversion unit 122 substitutes the environment reference information and the environment information for the variables of the selected conversion equation.

Then, the conversion unit 122 calculates the conversion equation. This computes comparative information.

Based on FIG. 10, the reference file 250 is described. The reference file 250 is stored in the storage unit 191.

The reference file 250 is a table including the reference record 251 for each model. One row in the reference file 250 corresponds to one reference record 251.

The reference record 251 includes a model ID, environment reference information, and state reference information.

The model ID is an identifier for identifying a model. The model is a type of an equipment.

The environment reference information is information indicating a reference environment.

The state reference information is information indicating a reference state. The reference state is a state serving as a reference. In detail, the reference state is a state serving as a reference in the reference environment.

By referring back to FIG. 9, the description continues from step S126.

Step S126 and step S127 are an evaluation process.

At step S126, the evaluation unit 123 compares the comparative information acquired at step S125 with the reference information. This allows acquirement of a comparison result. The comparison result is a difference between the comparative information and the reference information.

Specifically, the evaluation unit 123 compares the comparative information with the reference information in a manner as follows.

First, the evaluation unit 123 extracts an N-th character from the head of the specified equipment ID as a model ID of the specified equipment.

Next, the evaluation unit 123 selects, from the reference file 250, a reference record 251 including the model ID of the specified equipment.

Next, the evaluation unit 123 extracts the state reference information from the selected reference record 251.

Then, the evaluation unit 123 compares the comparative information with the state reference information.

At step S127, the evaluation unit 123 evaluates the state of the specified equipment at a specified time based on the comparison result acquired at step S126.

Specifically, the evaluation unit 123 computes a degree of divergence between the comparative information and the reference information. The computed degree of divergence is an evaluation result acquired by evaluating the state of a specified equipment at a specified time.

Figure 11:
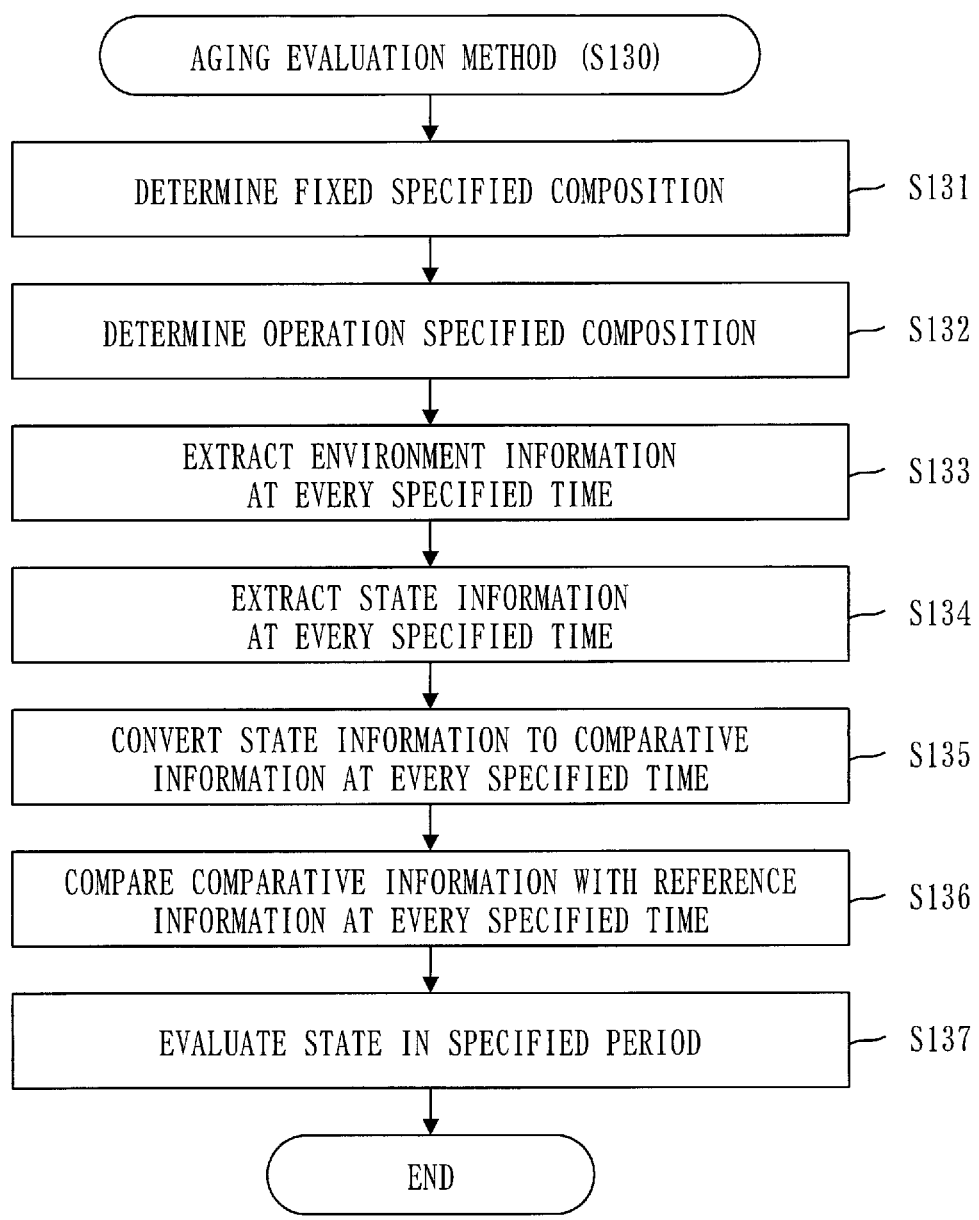
FIG. 11 is a flowchart of an aging evaluation method (S130) in Embodiment 1.

Based on FIG. 11, the aging evaluation method (S130) is described.

Step S131 to step S134 are an extraction process.

At step S131, the extraction unit 121 determines a fixed specified composition by using the fixed composition file 230.

Specifically, the extraction unit 121 determines a fixed specified composition in a manner as follows.

First, the extraction unit 121 extracts a specified equipment ID and a specified period from request data. A time included in the specified period is a specified time.

Next, the extraction unit 121 selects, for each specified time, a fixed composition record 231 corresponding to the specified time and the specified equipment ID, from the fixed composition file 230. A method of selecting a fixed composition record 231 is identical to step S121 of FIG. 9.

Then, the extraction unit 121 extracts, for each specified time, a fixed composition ID and a car number, from the selected fixed composition record 231.

A fixed composition identified by the extracted fixed composition ID is a fixed specified composition.

A car identified by the extracted fixed composition ID and car number is a specified car. The specified car is a car having the specified equipment installed thereon.

For example, it is assumed that the specified equipment ID is "equipment A" and the specified period is from "Jan. 1, 2016" to "Mar. 1, 2016". It is also assumed that the fixed composition file 230 includes a first fixed composition record 231 and a second fixed composition record 231. It is assumed that the first fixed composition record 231 includes a car number of "No. 1", equipment information including "equipment A", a start time of "Jan. 1, 2016", and an end time of "Feb. 1, 2016". It is assumed that the second fixed composition record 231 includes a car number of "No. 2", equipment information including "equipment A", a start time of "Feb. 1, 2016", and an end time of "-(non-end)".

In this case, the extraction unit 121 selects, from the fixed composition file 230, the first fixed composition record 231 and the second fixed composition record 231 corresponding to the specified equipment ID and the specified period. Then, the extraction unit 121 extracts the car number of "No. 1" from the first fixed composition record 231 and the car number of "No. 2" from the second fixed composition record 231. The car "No. 1" is a specified car having "equipment A"

installed thereon from "Jan. 1, 2016" to "Feb. 1, 2016". The car "No. 2" is a specified car having "equipment A" installed thereon from "Feb. 1, 2016".

At step S132, the extraction unit 121 determines an operation specified composition by using the operation composition file 240.

Specifically, the extraction unit 121 determines an operation specified composition in a manner as follows.

First, the extraction unit 121 extracts a specified period from the request data. A time included in the specified period is a specified time.

Next, the extraction unit 121 selects, for each specified time, an operation composition record 241 corresponding to the specified time and the fixed specified composition, from the operation composition file 240. A method of selecting the operation composition record 241 is identical to step S122 of FIG. 9.

Then, the extraction unit 121 extracts, for each specified time, a main composition ID and a sub-composition ID from the selected operation composition record 241.

An operation composition including a fixed composition identified by the extracted main composition ID as a main composition and including a fixed composition identified by the extracted sub-composition ID as a sub-composition is an operation specified composition.

At step S133, the extraction unit 121 extracts, for each specified time, environment information corresponding to a set of the specified time and the operation specified composition, from the environment file 210. A method of extracting environment information corresponding to a set of the specified time and the operation specified composition is identical to step S123 of FIG. 9.

At step S134, the extraction unit 121 extracts, for each specified time, state information corresponding to a set of the specified time and the specified equipment, from the state file 220. A method of extracting state information corresponding to a set of the specified time and the specified equipment is identical to step S124 of FIG. 9.

Step S135 is a conversion process.

At step S135, the conversion unit 122 converts, for each specified time, the state information extracted at step S134 to comparative information by using the environment information extracted at step S133. A method of converting the state information to comparative information by using environment information is identical to step S125 of FIG. 9.

Step S136 and step S137 are an evaluation process.

At step S136, the evaluation unit 123 compares, for each specified time, the comparative information acquired at step S135 with reference information. A method of comparing the comparative information with reference information is identical to step S126 of FIG. 9.

At step S137, the evaluation unit 123 evaluates the state of the specified equipment in the specified period based on the comparison result acquired for each specified time at step S126.

Specifically, the evaluation unit 123 computes, for each specified time, a degree of divergence between the comparative information and the reference information. The degree of divergence for each specified time is an evaluation result acquired by evaluating the state of the specified equipment in the specified period.

Figure 12:
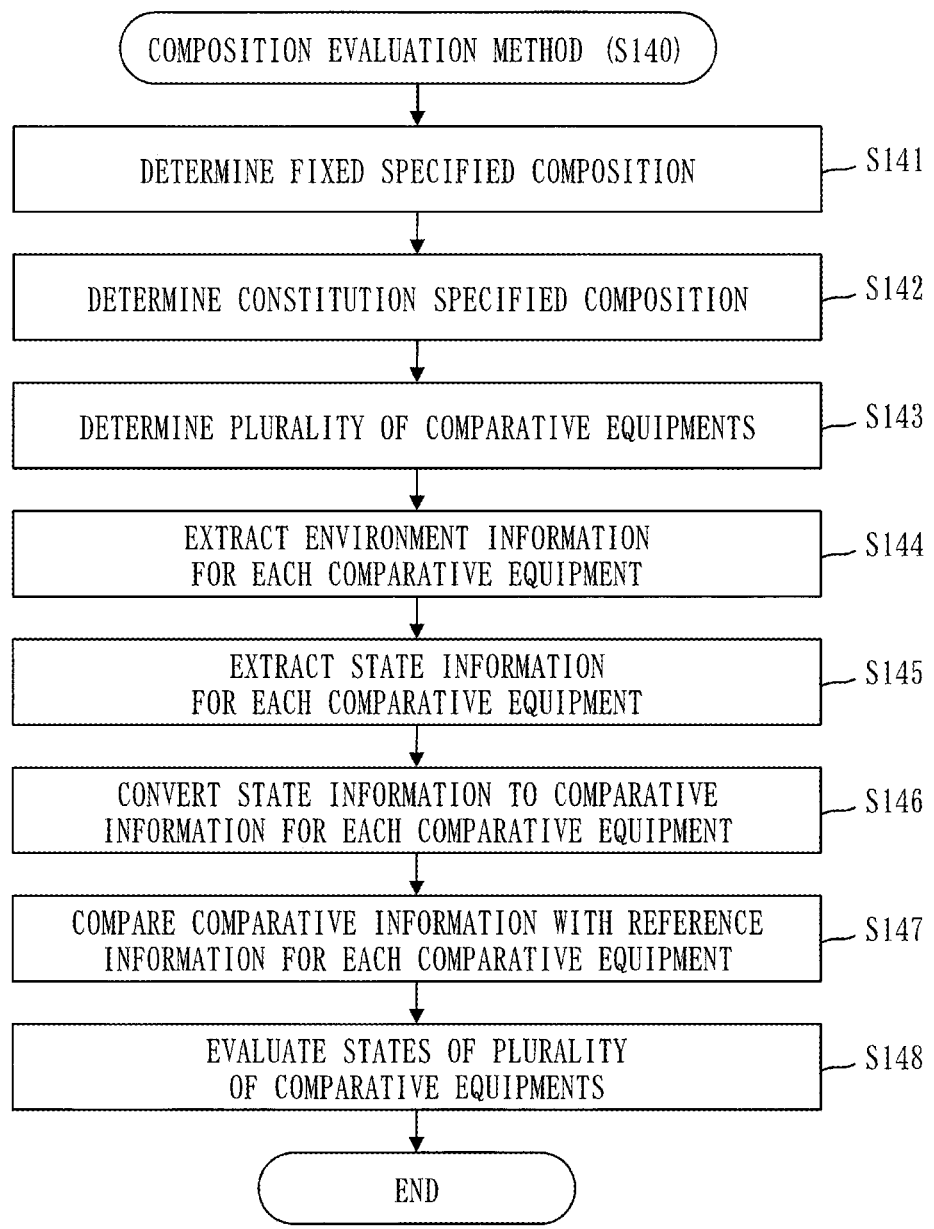
FIG. 12 is a flowchart of a composition evaluation method (S140) in Embodiment 1.

Based on FIG. 12, the composition evaluation method (S140) is described.

Step S141 to step S145 are an extraction process.

At step S141, the extraction unit 121 determines a fixed specified composition by using the fixed composition file 230. A method of determining a fixed specified composition is identical to step S121 of FIG. 9.

At step S142, the extraction unit 121 determines a constitution specified composition by using the operation composition file 240. The constitution specified composition is a fixed composition included in an operation composition including a fixed specified composition. The constitution specified compositions also include a fixed specified composition.

Specifically, the extraction unit 121 determines a constitution specified composition in a manner as follows.

First, the extraction unit 121 extracts a specified time from the request data.

Next, the extraction unit 121 selects, from the operation composition file 240, an operation composition record 241 corresponding to the fixed specified composition and the specified time. A method of selecting the operation composition record 241 is identical to step S122 of FIG. 9.

Then, the extraction unit 121 extracts a main composition ID and a sub-composition ID from the selected operation composition record 241.

The fixed composition identified by the extracted main composition ID or sub-composition ID is a constitution specified composition. A fixed composition ID for identifying a constitution specified composition is referred to as a constitution specified composition ID.

At step S143, the extraction unit 121 determines a plurality of comparative equipments by using the fixed composition file 230. The plurality of comparative equipments are a plurality of equipments included in the constitution composition. However, each comparative equipment is of the same model as that of the specified equipment.

Specifically, the extraction unit 121 determines a comparative equipment for each constitution specified composition in a manner as follows.

First, the extraction unit 121 extracts a specified time from the request data.

Next, the extraction unit 121 selects, from the fixed composition file 230, a fixed composition record 231 corresponding to a constitution specified composition and the specified time. The fixed composition record 231 corresponding to the constitution specified composition and the specified time is a fixed composition record 231 which includes a constitution specified composition ID as a fixed composition ID, includes a time before the specified time as a start time, and also includes a time after the specified time or non-end as an end time.

Then, the extraction unit 121 extracts, from the selected fixed composition record 231, an equipment ID of the same type as that of the specified equipment. The equipment ID of the same model as that of the specified equipment is an equipment ID having N characters from the head which are common with the specified equipment ID. Also, the extraction unit 121 extracts a car number from the selected fixed composition record 231.

The equipment identified by the extracted equipment ID is a comparative equipment. An equipment ID for identifying a comparative equipment is referred to as a comparative equipment ID.

The car identified by the constitution specified composition ID and extracted car number is a specified car. The specified car is a car having a comparative equipment installed thereon.

At step S144, the extraction unit 121 extracts, for each comparative equipment, environment information corresponding to a set of a comparative equipment and a specified time, from the environment file 210.

Specifically, the extraction unit 121 extracts, for each comparative equipment, environment information corresponding to a set of a comparative equipment and a specified time in a manner as follows.

First, the extraction unit 121 extracts, from the fixed composition file 230, a maximum car number corresponding to the same fixed composition ID as the main composition ID extracted at step S142. Also, the extraction unit 121 extracts, from the fixed composition file 230, a maximum car number corresponding to the same fixed composition ID as the sub-composition ID in the order in which sub-composition IDs extracted at step S142 are arranged.

Next, the extraction unit 121 computes a car number of a specified car in the operation composition by using the extracted maximum car number, the comparative specified composition ID extracted at step S142, and the car number extracted at step S143. A method of computing a car number of the specified car in the operation composition is identical to step S123 of FIG. 9.

Next, the extraction unit 121 selects, from the environment file 210, an environment record 211 including the specified time, the car number of the specified car in the operation composition, and the main composition ID extracted at step S142.

Then, the extraction unit 121 extracts environment information from the selected environment record 211.

At step S145, the extraction unit 121 extracts, for each comparative equipment, state information corresponding to a set of the comparative equipment and the specified time from the state file 220. A method of extracting state information corresponding to a set of the comparative equipment and the specified time is identical to the method of extracting state information corresponding to a set of the specified equipment and the specified time at step S124 of FIG. 9.

Step S146 is a conversion process.

At step S146, the conversion unit 122 converts, for each comparative equipment, the state information extracted at step S145 to comparative information by using the environment information extracted at step S144. A method of converting the state information to comparative information by using the environment information is identical to step S125 of FIG. 9.

Step S147 and step S148 are an evaluation process.

At step S147, the evaluation unit 123 compares, for each comparative equipment, the comparative information acquired at step S146 with reference information. A method of comparing the comparative information with reference information is identical to step S126 of FIG. 9.

At step S148, the evaluation unit 123 evaluates the states of the plurality of comparative equipments at a specified time based on the comparison result acquired at step S126 for each comparative equipment.

Specifically, the evaluation unit 123 computes, for each comparative equipment, a degree of divergence between the comparative information and the reference information. The degree of divergence for each comparative equipment is an evaluation result acquired by evaluating the states of the plurality of comparative equipments at the specified time.

Figure 13:
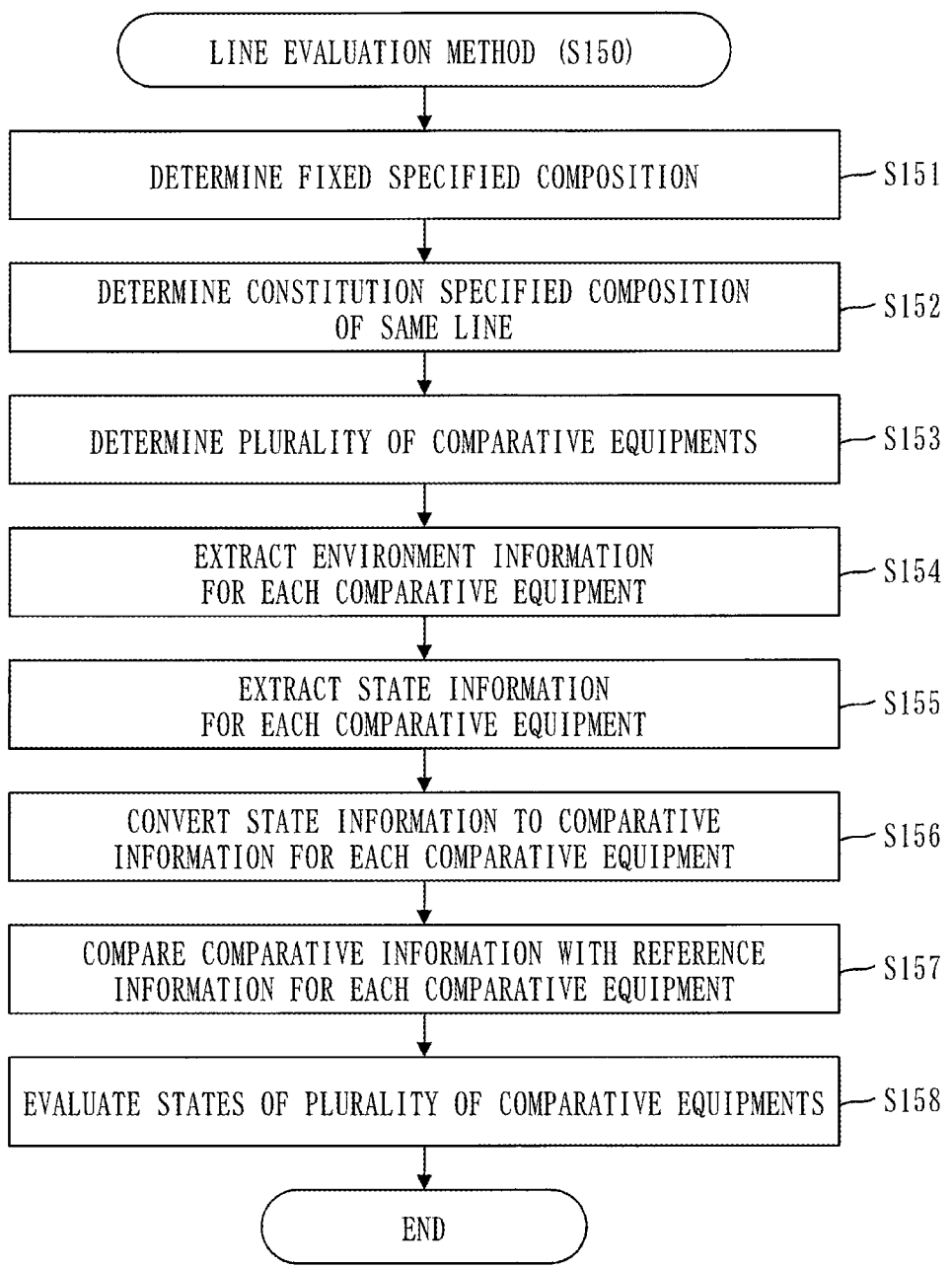
FIG. 13 is a flowchart of a line evaluation method (S150) in Embodiment 1.

Based on FIG. 13, the line evaluation method (S150) is described.

Step S151 to step S155 are an extraction process.

Step S151 is identical to step S141 of FIG. 12.

At step S152, by using the operation composition file 240, the extraction unit 121 determines each of a fixed composition included in the operation specified composition and a fixed composition included in the operation composition operated in the same line as that of the operation specified composition as a constitution specified composition. The operation specified composition is an operation composition including a fixed specified composition.

A method of determining a fixed composition included in the operation specified composition as a constitution specified composition is identical to step S142 of FIG. 12.

Specifically, the extraction unit 121 determines a fixed composition included in the operation composition operated in the same line as that of the operation specified composition as a constitution specified composition in a manner as follows.

First, the extraction unit 121 selects, from the operation composition file 240, an operation composition record 241 including a main composition ID of an operation specified composition.

Next, the extraction unit 121 extracts line information from the operation composition record 241 including the main composition ID of the operation specified composition.

Next, the extraction unit 121 selects, from the operation composition file 240, an operation composition record 241 corresponding to a specified time and the extracted line information. The operation composition record 241 corresponding to the specified time and the extracted line information is an operation composition record 241 which includes the same line information as the extracted line information, includes a time before the specified time as a start time, and also includes a time after the specified time or non-end as an end time.

Then, the extraction unit 121 extracts a main composition ID and a sub-composition ID from the operation composition record 241 corresponding to the specified time and the extracted line information.

The fixed composition identified by the extracted main composition ID or sub-composition ID is a constitution specified composition.

Step S153 to step S155 are identical to step S143 to step S145 of FIG. 12.

Step S156 is a conversion process.

Step S156 is identical to step S146 of FIG. 12.

Step S157 and step S158 are an evaluation process.

Step S157 and step S158 are identical to step S147 and step S148 of FIG. 12.

Effects of Embodiment 1

The equipment evaluation method (S120) allows evaluation of the state of the specified equipment at the specified time.

The aging evaluation method (S130) allows evaluation of the state of the specified equipment in the specified period. As a result, changes with time of the specified equipment in the specified period can be confirmed.

The composition evaluation method (S140) allows evaluation of the states of the same model in the operation composition. As a result, the states of the same model in the operation composition can be compared.

The line evaluation method (S150) allows evaluation of the states of the same model in the same line. As a result, the states of the same model in the same line can be compared.

As described at step S104 of FIG. 3, when the set of the fixed composition ID, the car number, and the equipment information is changed, a fixed composition record 231 corresponding to the set after the change is additionally registered on the fixed composition file 230.

Therefore, even if an equipment installed on a car is changed to be installed on another car, the car with the equipment previously installed thereon can be specified with reference to the fixed composition file 230. That is, an installation change of the equipment can be managed by the fixed composition file 230.

Embodiment 2

Figure 14:
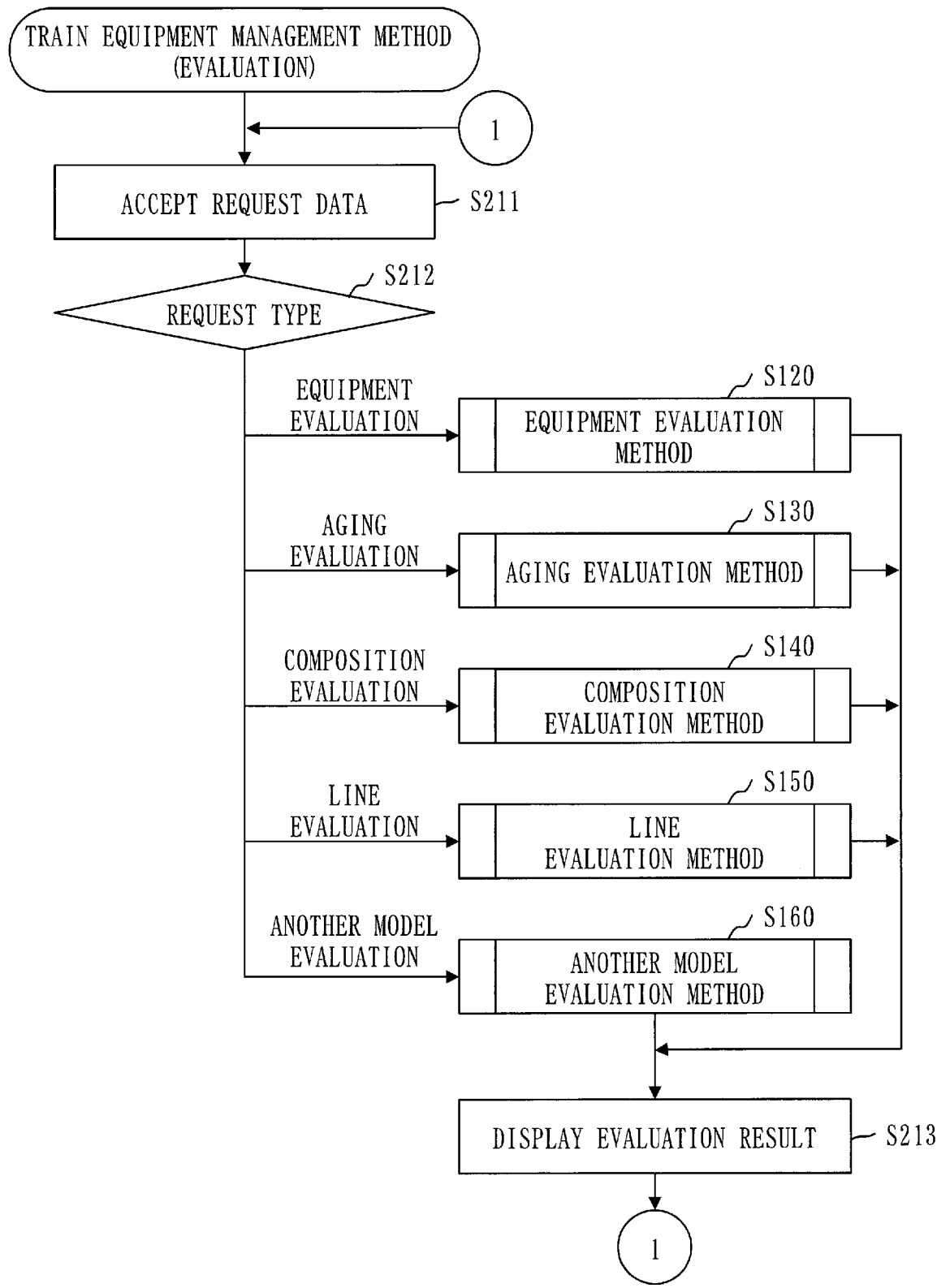
FIG. 14 is a flowchart of a train equipment management method (evaluation) in Embodiment 2.
Figure 15:
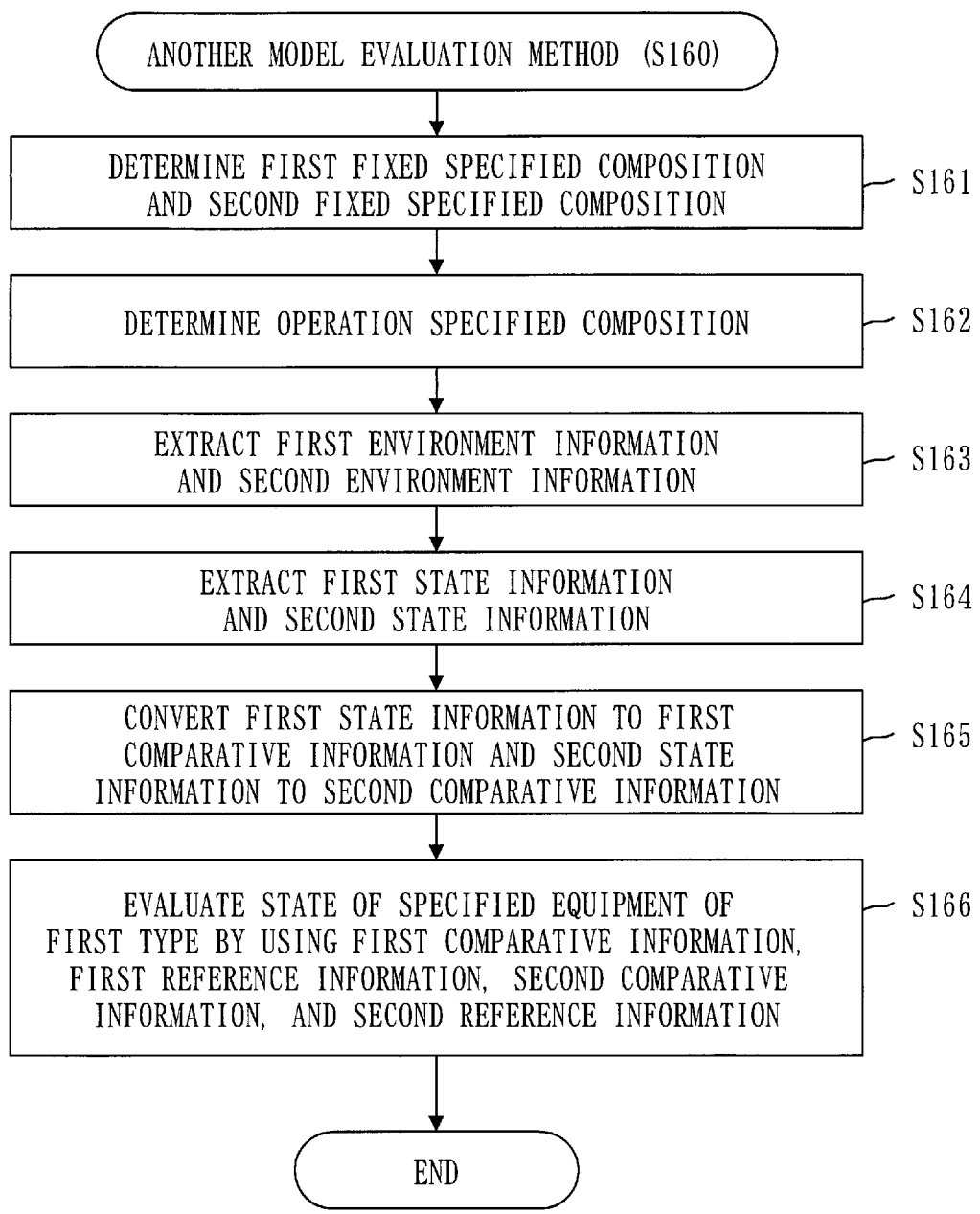
FIG. 15 is a flowchart of an another model evaluation method (S160) in Embodiment 2.

As for a mode of evaluating the state of a specified equipment of a first type based on the state of a specified equipment of a second type, differences from Embodiment 1 are mainly described based on FIG. 14 and FIG. 15.

Description of Structure

The structure of the train equipment management apparatus 100 is identical to that of FIG. 1 in Embodiment 1.

Description of Operation

A train equipment management method (registration) is identical to that of FIG. 3 in Embodiment 1.

Based on FIG. 14, a train equipment management method (evaluation) is described.

At step S211, as with step S111 of FIG. 8 in Embodiment 1, the accepting unit 193 accepts request data including a request type.

One request type is another model evaluation.

Another model evaluation is a process of evaluating the state of a specified equipment of a first type based on the state of a specified equipment of a second type.

Equipment types include a brake, safety apparatus, propulsive control apparatus, air conditioner, auxiliary power supply, and so forth. The safety apparatus is an equipment which issues an instruction to a brake. The propulsive control apparatus is an equipment which performs propulsive control in accordance with an accelerator.

Another model evaluation is requested, for example, when the state of a brake is desired to be evaluated with reference to the state of a safety apparatus.

When the request type is another model evaluation, the request data includes a specified time, a first specified equipment ID, and a second specified equipment ID, in addition to a request type.

The first specified equipment ID is an equipment ID for identifying a specified equipment of a first type, and the second specified equipment ID is an equipment ID for identifying a specified equipment of a second type.

At step S212, as with step S112 of FIG. 8 in Embodiment 1, the control unit 120 determines a request type included in the request data.

When the request type is another model evaluation, the process proceeds to step S160. Step S160 is an another model evaluation method. The another model evaluation method (S160) will be described further below.

After the another model evaluation method (S160), the process proceeds to step S213.

At step S213, as with step S113 of FIG. 8 in Embodiment 1, the display unit 194 displays the evaluation result.

After the another model evaluation method (S160), the display unit 194 displays a result of another model evaluation.

Based on FIG. 15, the another model evaluation method (S160) is described.

Step S161 to step S164 are a process corresponding to step S121 to step S124 of FIG. 9 in Embodiment 1.

At step S161, the extraction unit 121 determines, by using the fixed composition file 230, a first fixed specified composition corresponding to a first specified equipment ID and the specified time, and a second fixed specified composition corresponding to a second specified equipment ID and the specified time.

Specifically, the extraction unit 121 determines a fixed specified composition in a manner as follows.

First, the extraction unit 121 extracts a first specified equipment ID, a second specified equipment ID, and a specified time from the request data.

Next, the extraction unit 121 selects, from the fixed composition file 230, a first fixed composition record 231 corresponding to the first specified equipment ID and the specified time, and a second fixed composition record 231 corresponding to the second specified equipment ID and the specified time. A method of selecting a fixed specified composition is identical to step S121 of FIG. 9 in Embodiment 1.

Then, the extraction unit 121 extracts a fixed composition ID and a car number from each of the first fixed composition record 231 and the second fixed composition record 231.

The fixed composition ID extracted from the first fixed composition record 231 is referred to as a first fixed specified composition ID. The fixed composition identified by the first fixed specified composition ID is a first fixed specified composition. The fixed composition ID extracted from the second fixed composition record 231 is referred to as a second fixed specified composition ID. The fixed composition identified by the second fixed specified composition ID is a second fixed specified composition.

A car identified by the first fixed specified composition ID and the car number extracted from the first fixed composition record 231 is a first specified car. The first specified car is a car having the specified equipment of the first type installed thereon. A car identified by the second fixed specified composition ID and the car number extracted from the second fixed composition record 231 is a second specified car. The second specified car is a car having the specified equipment of the second type installed thereon.

At step S162, the extraction unit 121 determines, by using the operation composition file 240, an operation specified composition corresponding to the first fixed specified composition and the specified time. A method of determining an operation specified composition is identical to step S122 of FIG. 9 in Embodiment 1.

At step S163, the extraction unit 121 extracts first environment information and second environment information from the environment file 210.

The first environment information is environment information corresponding to a set of the specified time and the operation specified composition of the first type. The second environment information is environment information corresponding to a set of the specified time and the operation specified composition of the second type.

A method of extracting the environment information is identical to that at step S123 of FIG. 9 in Embodiment 1.

At step S164, the extraction unit 121 extracts first state information and second state information from the state file 220.

The first state information is state information corresponding to a set of the specified time and a specified equipment of the first type. The second state information is state information corresponding to a set of the specified time and a specified equipment of the second type.

A method of extracting the state information is identical to that at step S124 of FIG. 9 in Embodiment 1.

Step S165 is a process corresponding to step S125 of FIG. 9 in Embodiment 1.

At step S165, the conversion unit 122 converts the first state information to first comparative information by using the first environment information, and converts the second state information to second comparative information by using the second environment information.

A method of converting state information to comparative information is identical to that at step S125 of FIG. 9 in Embodiment 1.

Step S166 is a process corresponding to step S126 of FIG. 9 in Embodiment 1.

At step S166, the evaluation unit 123 evaluates the state of the specified equipment of the first type by using the first comparative information, first reference information, the second comparative information, and second reference information.

The first reference information is state reference information corresponding to the first type. The second reference information is state reference information corresponding to the second type.

A method of acquiring state reference information is identical to that at step S126 of FIG. 9 in Embodiment 1.

Specifically, the evaluation unit 123 evaluates the state of the specified equipment of the first type in a manner as follows.

First, the evaluation unit 123 selects an evaluation expression corresponding to the model of the specified equipment of the first type. The evaluation expression for each model is defined in advance. The evaluation expression includes a variable corresponding to the first comparative information, a variable corresponding to the first reference information, a variable corresponding to the second comparative information, and a variable corresponding to the second reference information.

Next, the evaluation unit 123 substitutes the first comparative information, the first reference information, the second comparative information, and the second reference information into the variables of the selected evaluation expression.

Then, the evaluation unit 123 calculates the evaluation expression. This computes an evaluation value. The evaluation value is an evaluation result acquired by evaluating the state of the specified equipment of the first type.

Effects of Embodiment 2

The state of the specified equipment of the first type can be evaluated based on the state of the specified equipment of the second type. For example, the state of a brake can be evaluated based on the state of a safety device.

Embodiment 3

As for a mode of managing history of comparative information, differences from Embodiment 1 and Embodiment 2 are mainly described based on FIG. 16.

Description of Structure

The structure of the train equipment management apparatus 100 is identical to that of FIG. 1 in Embodiment 1.

Description of Operation

A train equipment management method (registration) is identical to that of FIG. 3 in Embodiment 1.

A flow of the process of a train equipment management method (evaluation) is identical to that of FIG. 14 in Embodiment 2.

However, in the train equipment management method (evaluation), the conversion unit 122 registers the comparative information in a comparative information file 260 in association with the specified time.

Specifically, at step S125 of FIG. 9, step S135 of FIG. 11, step S146 of FIG. 12, step S156 of FIG. 13, and step S165 of FIG. 15, the conversion unit 122 registers the comparative information in the comparative information file 260 in association with the specified time.

Based on FIG. 16, the comparative information file 260 is described. The comparative information file 260 is stored in the storage unit 191.

The comparative information file 260 is a table including comparative information record 261 for each set of a time and an equipment. One row in the comparative information file 260 corresponds to one comparative information record 261.

The comparative information record 261 includes a time, an equipment ID, and comparative information.

Effects of Embodiment 3

The comparative information file 260 allows management of changes with time of the comparative information.

Also, if comparative information is registered in the comparative information file 260, the comparative information can be acquired without converting the state information to comparative information. That is, the process for converting the state information to comparative information is not required.

Specifically, when comparative information corresponding to a set of a specified time and a specified equipment is registered on the comparative information file 260, step S123 to step S125 of FIG. 9 can be omitted. Similarly, step S133 to step S135 of FIG. 11, step S144 to step S146 of FIG. 12, step S154 to step S156 of FIG. 13, and step S163 to step S165 of FIG. 15 can be omitted.

As a result, the load of the train equipment management apparatus 100 can be reduced, and also the time required for evaluation can be shortened.

Embodiment 4

Figure 17:
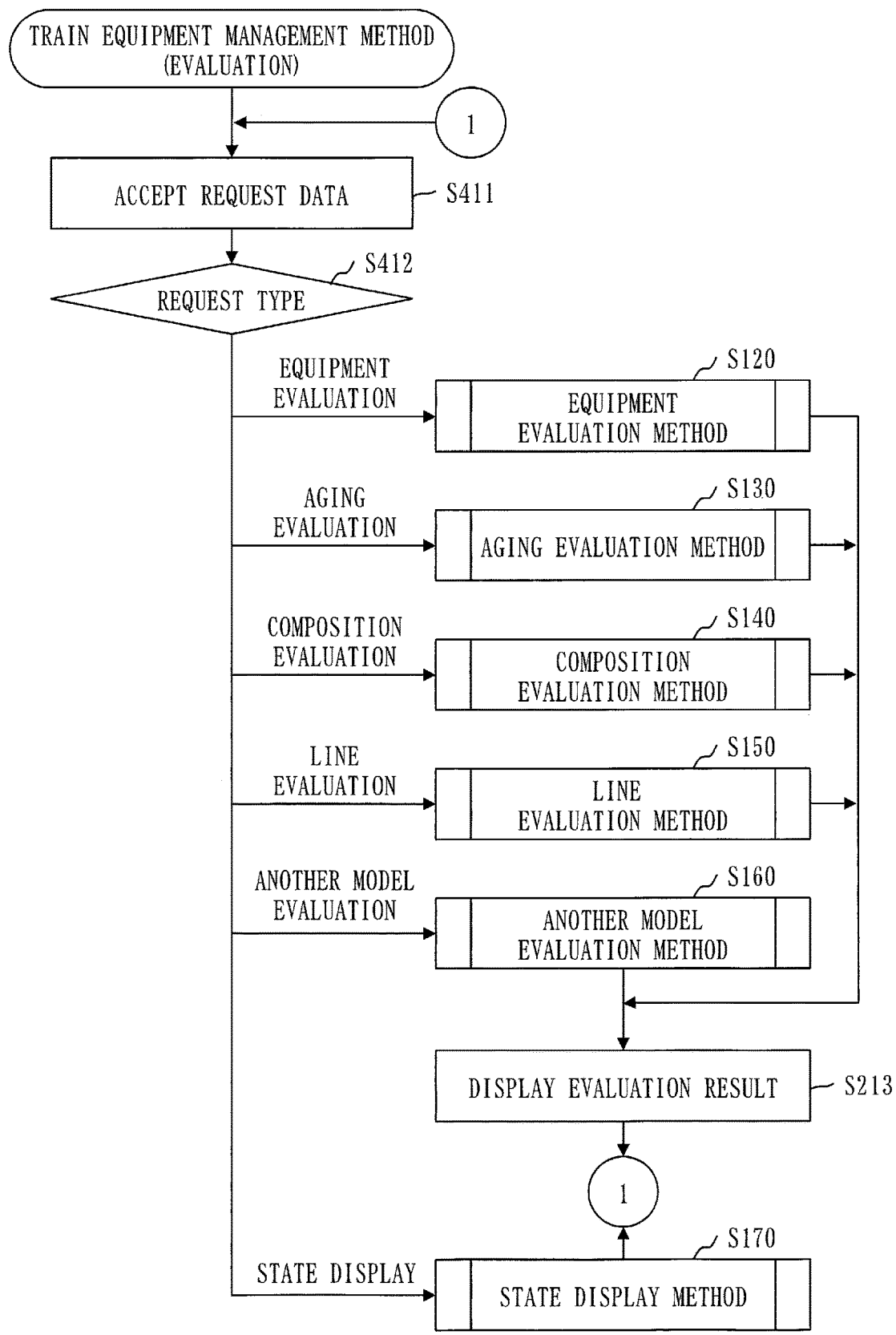
FIG. 17 is a flowchart of a train equipment management method (evaluation) in Embodiment 4.
Figure 18:
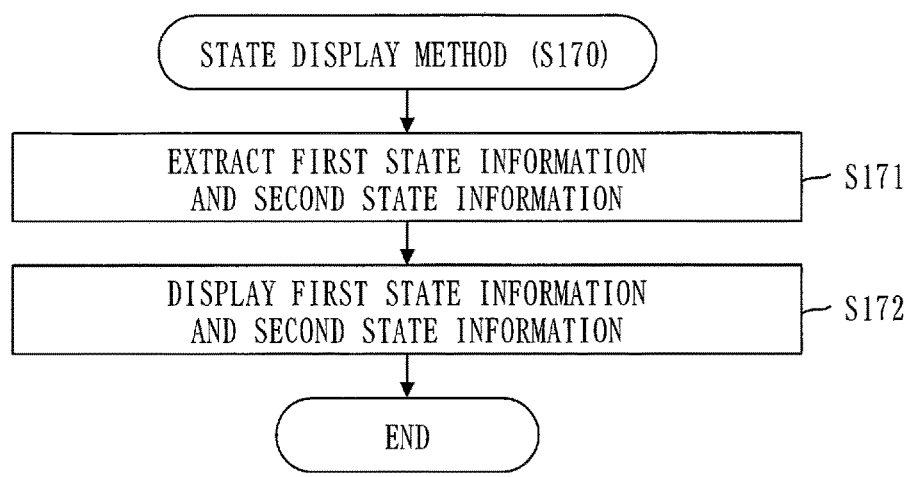
FIG. 18 is a flowchart of a state display method (S170) in Embodiment 4.

As for a mode in which state information is viewed, differences from Embodiment 1 to Embodiment 3 are mainly described based on FIG. 17 and FIG. 18.

Description of Structure

The structure of the train equipment management apparatus 100 is identical to that of FIG. 1 in Embodiment 1.

Description of Operation

A train equipment management method (registration) is identical to that of FIG. 3 in Embodiment 1.

Based on FIG. 17, a train equipment management method (evaluation) is described.

At step S411, as with step S111 of FIG. 8 in Embodiment 1, the accepting unit 193 accepts request data including a request type.

One request type is state display.

State display is a process of displaying the state of a specified equipment at a specified time. Specifically, state display is a process of displaying the state of a specified equipment of a first type in a specified period and the state of a specified equipment of a second type in the specified period side by side.

When the request type is state display, the request data includes a specified period, a first specified equipment ID, and a second specified equipment ID, in addition to a request type.

At step S412, as with step S112 of FIG. 8 in Embodiment 1, the control unit 120 determines a request type included in the request data.

When the request type is state display, the process proceeds to step S170. Step S170 is a state display method.

Based on FIG. 18, the state display method (S170) is described.

Step S171 is a process corresponding to step S164 of FIG. 15 in Embodiment 2.

At step S171, the extraction unit 121 extracts, from the state file 220, first state information for each specified time and second state information for each specified time.

The specified time is a time included in a specified period.

The first state information is state information corresponding to a set of the specified time and the specified equipment of the first type. The second state information is state information corresponding to a set of the specified time and the specified equipment of the second type.

A method of extracting state information is identical to step S124 of FIG. 9 in Embodiment 1.

Step S172 is a display process.

At step S172, the display unit 194 displays the first state information for each specified time and the second state information for each specified time side by side.

Effects of Embodiment 4

The state of the specified equipment can be viewed by the user.

Specifically, the state of the specified equipment of the first type in the specified period and the state of the specified equipment of the second type in the specified period can be arranged side by side and viewed by the user.

Supplement of Embodiments

In the embodiments, the functions of the train equipment management apparatus 100 may be implemented by hardware.

Figure 19:
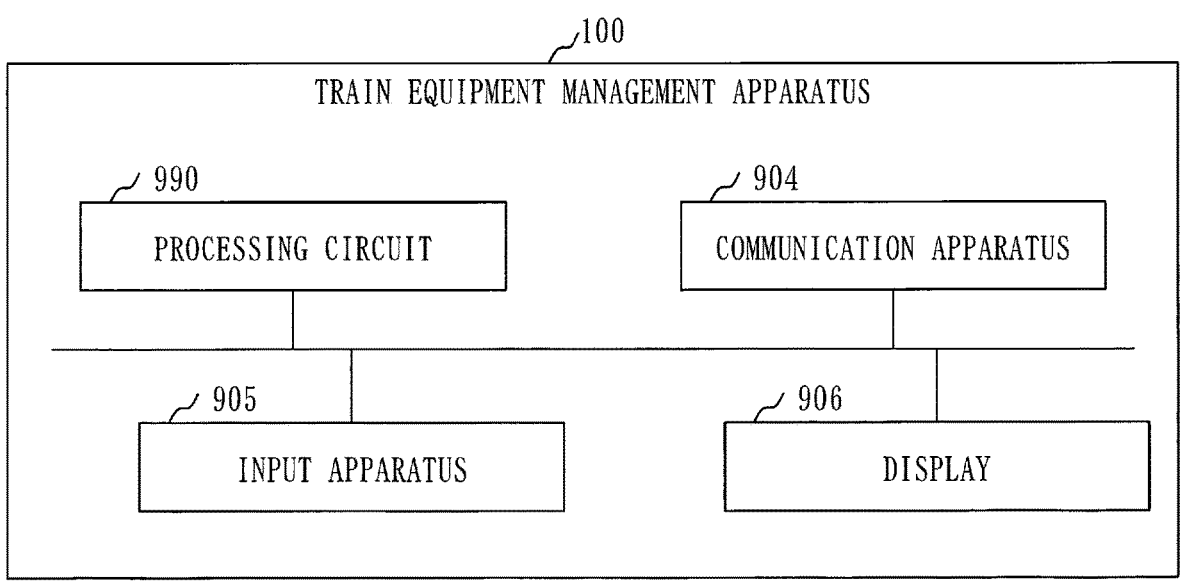
FIG. 19 illustrates a hardware structure of the train equipment management apparatus 100 in the embodiments.

FIG. 19 illustrates the structure when the functions of the train equipment management apparatus 100 are implemented by hardware.

The train equipment management apparatus 100 includes a processing circuit 990. The processing circuit 990 is also referred to as processing circuitry.

The processing circuit 990 is a dedicated electronic circuit which achieves functions of "units" such as the registration unit 110, the control unit 120, the extraction unit 121, the conversion unit 122, the evaluation unit 123, and the storage unit 191.

Specifically, the processing circuit 990 is a single circuit, a composite circuit, programmed processor, a concurrently-programmed processor, a logic IC, a GA, an ASIC, a FPGA, or a combination of these. GA is an abbreviation for Gate Array, ASIC is an abbreviation for Application Specific Integrated Circuit, and FPGA is an abbreviation for Field Programmable Gate Array.

The train equipment management apparatus 100 includes a plurality of processing circuits which replace the processing circuit 990. The plurality of processing circuits share the functions of the "units".

The functions of the train equipment management apparatus 100 may be implemented by a combination of software and hardware. That is, the functions of the "units" may be partially implemented by software and the remaining functions of the "units" may be implemented by hardware.

The embodiments are examples of preferred modes, and are not intended to restrict the technical range of the present invention. The embodiments may be partially implemented or may be implemented in combination of another mode. The procedure described by using a flowchart and so forth may be changed as appropriate.

REFERENCE SIGNS LIST

100: train equipment management apparatus; 110: registration unit; 120: control unit; 121: extraction unit; 122: conversion unit; 123: evaluation unit; 191: storage unit; 192: reception unit; 193: accepting unit; 194: display unit; 210: environment file; 211: environment record; 220: state file; 221: state record; 230: fixed composition file; 231: fixed composition record; 240: operation composition file; 241: operation composition record; 250: reference file; 251: reference record; 260: comparative information file; 261: comparative information record; 901: processor; 902: memory; 903: auxiliary storage apparatus; 904: communication apparatus; 905: input apparatus; 906: display; 990: processing circuit

The invention claimed is:

1. A train equipment management system comprising:
   a memory; and
   processing circuitry, including at least one processor, configured to
      periodically receive train provision data from a train composition, the provision data including environment data for each train car included in the train composition, state data for train equipment install on each train car included in the train composition, fixed composition data for each fixed composition included in the train composition, and operation composition data of the train composition;
      extract and store the received provision data in a state of linking train equipment state information with fixed composition information and the fixed composition information with operation composition information;
      receive, from a user using an input apparatus, a request for evaluation of train equipment, the request including a type of evaluation, a specified time, and a specified equipment ID;
      extract, from the memory, environment information indicating an environment at the specified time of a car having the specified equipment installed thereon using the provision data;
      convert, using the extracted environment information, state information indicating a state of the specified equipment at the specified time to comparative information indicating a state of the specified equipment in a reference environment,
      compute, using the at least one processor, a degree of divergence from the comparative information and reference information indicating a state serving as a reference;

evaluate the state of the specified equipment at the specified time based on the computed degree of divergence, and display the evaluation result on a display apparatus.

2. The train equipment management system according to claim 1, wherein the processing circuitry extracts a car having the specified equipment installed thereon.

3. The train equipment management system according to claim 1, wherein the processing circuitry converts the state information to the comparative information by using a conversion method predetermined in accordance with the specified equipment.

4. The train equipment management system according to claim 1, wherein the processing circuitry is further configured to extract and store the received provision data into a plurality of tables, the plurality of tables linking train equipment state information with the fixed composition information and the fixed composition information with operation composition information; and wherein the plurality of tables includes a fixed composition table indicating, for each fixed composition including one or more cars, an equipment installed on a car included in the fixed composition, an operation composition table indicating, for each operation composition including one or more fixed compositions, fixed compositions included in the operation composition, and an environment table including environment information for each set of a time and an operation composition; and wherein the processing circuitry extracts the environment information by determining a fixed composition including a car having the specified equipment installed thereon as a fixed specified composition using the fixed composition table, determining an operation composition including the fixed specified composition as an operation specified composition using the operation composition table, and extracting, from an environment table, environment information corresponding to a set of the specified time and the operation specified composition as environment information for use by conversion.

5. The train equipment management system according to claim 4, wherein the processing circuitry determines a fixed composition including a car having a specified equipment of a first type installed thereon as a first fixed specified composition and extracts first environment information, and determines a fixed composition including a car having a specified equipment of a second type installed thereon as a second fixed specified composition and extracts second environment information, converts state information indicating a state of the specified equipment of the first type at the specified time to first comparative information by using the first environment information, and converts state information indicating a state of the specified equipment of the second type at the specified time to second comparative information by using the second environment information, and evaluates a state of the specified equipment of the first type at the specified time by using the first comparative information, the second comparative information, first reference information corresponding to the first type, and second reference information corresponding to the second type.

6. The train equipment management system according to claim 1, wherein the processing circuitry extracts one or more cars each having the specified equipment installed thereon in a specified period.

7. The train equipment management system according to claim 1, wherein the processing circuitry extracts a comparative equipment of the same model as that of the specified equipment in a composition including a car having the specified equipment installed thereon, and evaluates a state of the comparative equipment in the same manner as for the specified equipment.

8. The train equipment management system according to claim 1, wherein the processing circuitry is further configured to extract and store the received provision data into a plurality of tables, the plurality of tables linking train equipment state information with the fixed composition information and the fixed composition information with operation composition information; and wherein the plurality of tables includes a fixed composition table indicating, for each fixed composition including one or more cars, an equipment installed on a car included in the fixed composition, an operation composition table indicating, for each operation composition including one or more fixed compositions, fixed compositions included in the operation composition, and an environment table including environment information for each set of a time and an operation composition; and wherein the processing circuitry extracts the environment information by determining a fixed composition including a car having the specified equipment installed thereon as a fixed specified composition using the fixed composition table, determining a fixed composition included in an operation composition including the fixed specified composition as an constitution specified composition using the operation composition table, determining a plurality of equipment included in the constitution specified composition as a plurality of comparative equipment using the fixed composition file, and extracting, for each comparative equipment, state information corresponding to a set of the comparative equipment and the specified time from a state file including state information for each set of a time and an equipment, and wherein the processing circuitry converts, for each comparative equipment, the state information corresponding to the set of the comparative equipment and the specified time to comparative information by using the environment information, compares, for each comparative equipment, the comparative information with the reference information, evaluates, for each comparative equipment, a state at the specified time based on a comparison result, and evaluates the state at the specified time of the plurality of comparative equipment based on an evaluation result for each comparative equipment.

9. The train equipment management system according to claim 8, wherein the processing circuitry determines, as the constitution specified composition, each of a fixed composition included in an operation specified composition, which is an operation composition including the fixed specified composition, and a fixed composition included in an operation composition operated on a same line as that of the operation specified composition.

10. The train equipment management system according to claim 1, wherein the processing circuitry causes a request screen having a user interface for selecting the specified time and the specified equipment to be displayed on a display.

11. The train equipment management system according to claim 1, wherein the processing circuitry registers the comparative information on a comparative information file in association with the specified time.

12. A train equipment management method comprising:
periodically receiving train provision data from a train composition, the provision data including environment data for each train car included in the train composition, state data for train equipment install on each train car included in the train composition, fixed composition data for each fixed composition included in the train composition, and operation composition data of the train composition;
extracting and storing in a memory the received provision data in a state of linking train equipment state information with fixed composition information and the fixed composition information with operation composition information;
receiving a request, from a user using an input apparatus, for evaluation of train equipment, the request including a type of evaluation, a specified time, and a specified equipment ID;
extracting from the memory environment information indicating an environment at the specified time of a car having the specified equipment installed thereon using the provision data;
converting, using the extracted environment information, state information indicating a state of the specified equipment at the specified time to comparative information indicating a state of the specified equipment in a reference environment;
computing, using a processor, a degree of divergence from the comparative information and reference information indicating a state serving as a reference;
evaluating the state of the specified equipment at the specified time based on the computed degree of divergence; and
displaying the evaluation result on a display apparatus.

13. A non-transitory computer readable medium storing a train equipment management program that causes a computer to execute:
a reception process of periodically receiving train provision data from a train composition, the provision data including environment data for each train car included in the train composition, state data for train equipment install on each train car included in the train composition, fixed composition data for each fixed composition included in the train composition, and operation composition data of the train composition;
an extraction process of extracting and storing in a memory the received provision data in a state of linking train equipment state information with fixed composition information and the fixed composition information with operation composition information;
a reception process of receiving a request, from a user using an input apparatus, for evaluation of train equipment, the request including a type of evaluation, a specified time, and a specified equipment ID;
an extraction process of extracting from the memory environment information indicating an environment at the specified time of a car having the specified equipment installed thereon using the provision data;
a conversion process of converting, using the extracted environment information, state information indicating a state of the specified equipment at the specified time to comparative information indicating a state of the specified equipment in a reference environment;
a computation process of computing, using a processor, a degree of divergence from the comparative information and reference information indicating a state serving as a reference;
an evaluation process of evaluating the state of the specified equipment at the specified time based on the computed degree of divergence; and
a display process of displaying the evaluation result on a display apparatus.

* * * * *